United States Patent
Nakamura (10) Patent No.: US 7,577,350 B2
(45) Date of Patent: Aug. 18, 2009

(54) LENS APPARATUS AND IMAGING APPARATUS

(75) Inventor: Tomoyuki Nakamura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 361 days.

(21) Appl. No.: 11/689,985

(22) Filed: Mar. 22, 2007

(65) Prior Publication Data

US 2007/0230934 A1  Oct. 4, 2007

(30) Foreign Application Priority Data

Mar. 31, 2006  (JP) .............................. 2006-097363

(51) Int. Cl.
G03B 17/00 (2006.01)
G02B 7/28 (2006.01)

(52) U.S. Cl. ........................................ 396/111; 396/80

(58) Field of Classification Search .................. 396/80, 396/111; 348/345, 349, 350
See application file for complete search history.

(56) References Cited

U.S. PATENT DOCUMENTS 6,522,480 B2 * 2/2003 Nakamura ................... 359/698
6,822,801 B2 11/2004 Yahagi et al.
7,330,647 B2 * 2/2008 Sasaki et al. ................ 396/130
2004/0165276 A1 8/2004 Yahagi et al.
2006/0044454 A1 3/2006 Kuwakino

FOREIGN PATENT DOCUMENTS

| JP | 62-087921 A | 4/1987 |
| JP | 03-034781 A | 2/1991 |
| JP | 2002-365517 A | 12/2002 |

* cited by examiner

Primary Examiner—Rodney E Fuller
(74) Attorney, Agent, or Firm—Canon USA Inc. IP Div (57) ABSTRACT

A lens apparatus configured to be mountable on a camera body having an image sensor includes a first focus lens unit, a splitting optical unit disposed between the first focus lens unit and the image sensor, a second focus lens unit disposed between the splitting optical unit and the image sensor, the second focus lens unit being movable from an initial position along an optical axis to vary a focusing state, a focusing state detection unit configured to detect the focusing state using a light flux from the splitting optical unit, an actuator configured to drive the first focus lens unit, and a controller configured to control driving of the actuator according to an output from the focusing state detection unit. The controller stops driving of the actuator if the second focus lens unit is located at a position different from the initial position.

6 Claims, 6 Drawing Sheets

LENS APPARATUS AND IMAGING APPARATUS

BACKGROUND OF THE INVENTION

1. Field of the Invention

The present invention relates to a lens apparatus which includes a splitting optical unit disposed in an optical path of an imaging optical system and which performs automatic focus control using a light flux from the splitting optical unit. The present invention also relates to an imaging apparatus including the lens apparatus.

2. Description of the Related Art

Conventionally, various automatic focus control techniques for imaging apparatuses, such as still cameras or video cameras, have been proposed. For example, Japanese Patent Application Laid-Open No. 2002-365517 discusses a lens/imaging apparatus which includes a splitting unit and a focus detection unit. The splitting unit is disposed in an optical path of an imaging optical system, and the focus detection unit is disposed in a split optical path generated by the splitting unit.

With respect to broadcast zoom lenses, for example, a lens apparatus disclosed in Japanese Patent Application Laid-Open No. 3-34781 has been known. The lens apparatus includes a focus lens unit, which is an anterior lens unit, and a macro lens unit, which is a part of a relay optical system. The macro lens unit is driven, independent from the focus lens unit, along an optical axis to perform focus control and to enable close-up photography.

In the above-described lens/imaging apparatus, automatic focus control is performed by detecting a focusing state using a split light flux obtained by the splitting unit. During the focus control, the relationship in a focal plane between an imaging unit and a focus detection unit is held constant.

However, in a case where close-up photography is performed with a macro lens unit disposed on the image side of the splitting unit, as discussed in Japanese Patent Application Laid-Open No. 3-34781, the relationship in a focal plane between the imaging unit and the focus detection unit may vary due to the movement of the macro lens unit. Therefore, correct automatic focus control may not be performed.

In addition, for special use of the macro lens unit, the macro lens unit can be used when a user wants to intentionally take a blurred image so as to obtain a special image effect. However, when the macro lens unit is used to perform blur photography, an operational characteristic different from that in close-up photography is required. More specifically, a focusing operation is required such that the amount of blurring increases in proportion to the amount of operation of the macro lens unit and an original object becomes in focus in response to the macro lens unit returning to its initial position.

SUMMARY OF THE INVENTION

The present invention is directed to providing a user-friendly lens apparatus and an imaging apparatus capable of performing appropriate automatic focus control according to a photographing situation.

According to an aspect of the present invention, a lens apparatus configured to be mountable on a camera body including an image sensor includes a first focus lens unit, a splitting optical unit disposed between the first focus lens unit and the image sensor, a second focus lens unit disposed between the splitting optical unit and the image sensor along the optical axis, the second focus lens unit being movable from an initial position along the optical axis to vary the focusing state, a focusing state detection unit configured to detect the focusing state using a light flux from the splitting optical unit, an actuator configured to drive the first focus lens unit, and a controller configured to control driving of the actuator according to an output from the focusing state detection unit. The controller stops driving of the actuator if the second focus lens unit is located at a position different from the initial position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various embodiments, features, and aspects of the invention will be described in detail below, by way of example, with reference to the drawings.

First Embodiment

Figure 1:
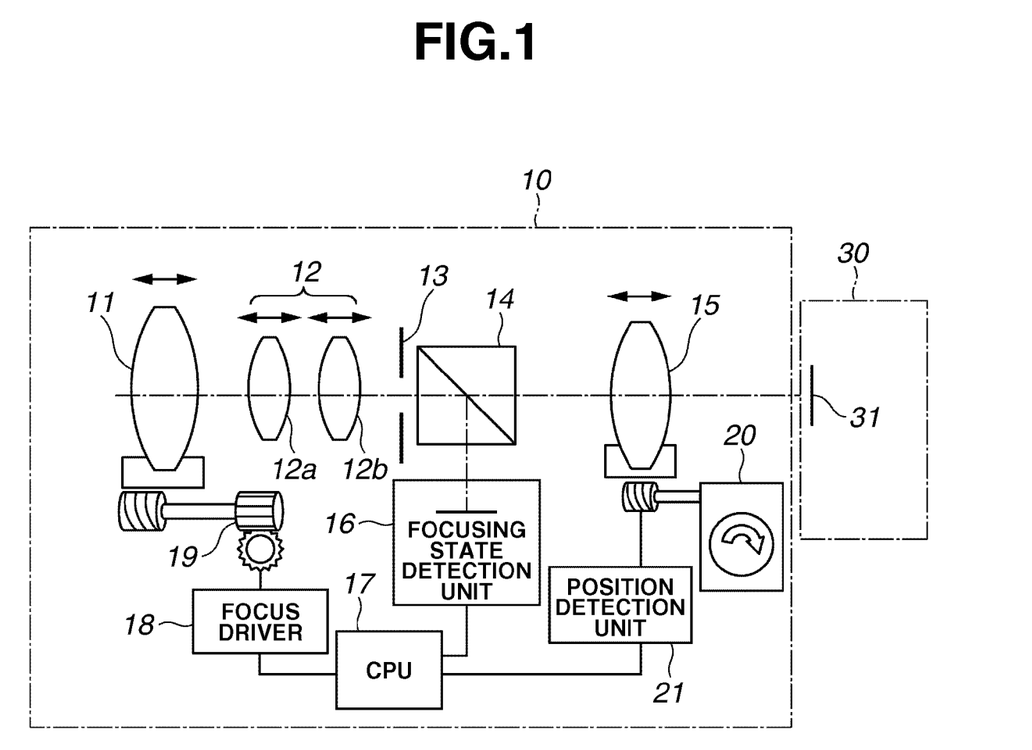
FIG. 1 illustrates a configuration of an imaging apparatus including a lens apparatus according to a first embodiment of the present invention.

FIG. 1 illustrates a configuration of an imaging apparatus including a lens apparatus according to a first embodiment of the present invention. The imaging apparatus includes a lens apparatus 10 and a camera body 30. The lens apparatus 10 is configured to be releasably secured to the camera body 30. The lens apparatus 10 includes, in order from an object side along an optical axis, a first focus lens unit 11, a magnification-varying lens unit 12, a diaphragm 13, a splitting optical unit 14, and a second focus lens unit 15. The magnification-varying lens unit 12 includes a variator lens 12a for varying magnification and a compensator lens 12b for compensating for variation of an image point due to the variation of magnification. The lens apparatus 10 is configured to form an image on an image sensor 31, which is incorporated in the camera body 30.

The lens apparatus 10 further includes a focusing state detection unit 16 disposed on a split optical path generated by the splitting optical unit 14. The focusing state detection unit 16 supplies an output indicative of a focusing state to a central processing unit (CPU) 17, which serves as a controller. The CPU 17 controls driving of a focus drive motor 19 via a focus driver 18 according to an output from the focusing state detection unit 16. The focus drive motor 19 drives the first focus lens unit 11 along the optical axis.

The second focus lens unit 15 is configured to be movable along the optical axis in response to a user manually operating an operation member 20. A position detection unit 21 detects the displacement of the second focus lens unit 15. The position detection unit 21 supplies an output indicative of the displacement of the second focus lens unit 15 to the CPU 17.

A part of a light flux representing an object image is split by the splitting optical unit 14 and enters the focusing state detection unit 16. The splitting optical unit 14 includes, for example, a half mirror or a half prism. The focusing state detection unit 16 outputs a focusing state detection value to the CPU 17. The CPU 17 performs a calculation based on the focusing state detection value and causes the drive motor 19 to drive the first focus lens unit 11 so as to perform automatic focus control.

The second focus lens unit 15 can be used for close-up photography for photographing an object which is closer than a focus end, or for blur photography for producing a special image effect. The close-up photography or blur photography can be implemented by moving the second focus lens unit 15 independently from the first focus lens unit 11.

In response to the position detection unit 21 detecting the displacement of the second focus lens unit 15, the CPU 17 stops automatic focus control by stopping supplying a driving signal to the focus driver 18. On the other hand, when the position detection unit 21 detects that the second focus lens unit 15 has returned to its initial position, the CPU 17 resumes automatic focus control by sending a driving signal to the focus driver 18.

Now, an automatic focus control operation will be described with reference to the flowchart of FIG. 2. First, the CPU 17 detects the current position of the second focus lens unit 15 based on the output of the position detection unit 21 and determines whether the second focus lens unit 15 is located at the initial position (step S10).

The CPU 17 defines a control characteristic obtained when the second focus lens unit 15 has returned to the initial position. The initial position indicates the position where the second focus lens unit 15 is located before an operation to vary a focusing state is performed. After the operation to vary a focusing state with the second focus lens unit 15 is completed, the CPU 17 smoothly resumes automatic focus control when the relationship in a focal plane between the image sensor 31 and the focusing state detection unit 16 has returned to its initial relationship (i.e., when the second focus lens unit 15 is located at the initial position).

When the second focus lens unit 15 is located at the initial position, that is, if it is determined that the focusing state varying operation with the second focus lens unit 15 is not being performed (YES in step S10), the CPU 17 continues automatic focus control. In such a case, the focusing state detection unit 16 detects the current focus position and sends the detected value to the CPU 17 (step S20). Then, based on the value obtained in step S20, the CPU 17 calculates the amount of movement of the first focus lens unit 11 required for moving from the current focusing state position to an in-focus state position (step S30).

Then, the focus driver 18 converts the amount of movement in the optical axis direction calculated in step S30 into a rotation angle of the focus drive motor 19 (step S40). Then, the focus drive motor 19 is driven by the rotation angle defined by the focus driver 18 (step S50). As the focus drive motor 19 is driven, the first focus lens unit 11 is moved in the optical axis direction. Thus, automatic focus control is performed to attain an in-focus state (step S60).

On the other hand, in step S10, if it is determined that the focusing state varying operation with the second focus lens unit 15 is being performed (NO in step S10), the CPU 17 stops supplying a driving signal to the focus driver 18 so as to stop moving the first focus lens unit 11 in the optical axis direction (i.e., stop automatic focus control) (step S70). Then, the processing returns to step S10 (the determination with the position detection unit 21). If it is determined in step S10 that the second focus lens unit 15 has returned to the initial position, the processing proceeds to the above-described steps S20 to S60 to resume automatic focus control.

Second Embodiment

Figure 3:
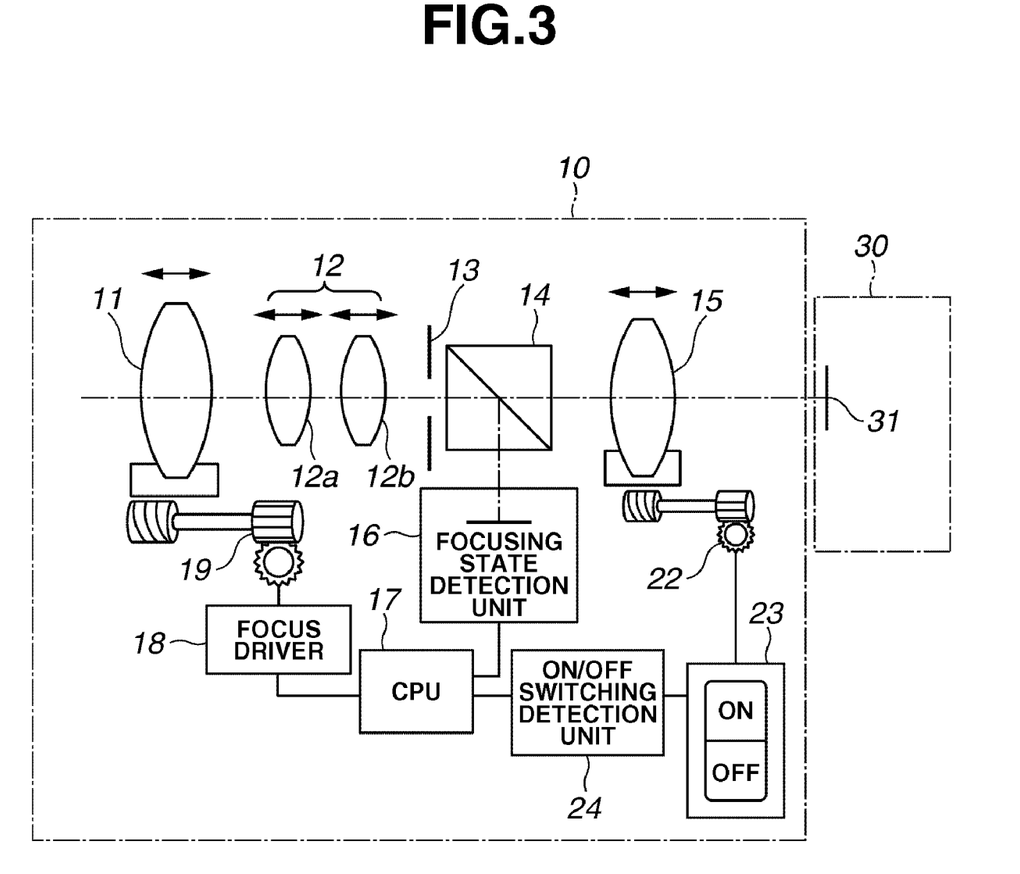
FIG. 3 illustrates a configuration of an imaging apparatus including a lens apparatus according to a second embodiment of the present invention.

FIG. 3 illustrates a configuration of an imaging apparatus including a lens apparatus according to a second embodiment. In FIG. 3, the same reference numerals as in the first embodiment denote similar members. The second focus lens unit 15 is configured to be movable along the optical axis by a drive motor 22. The drive motor 22 is connected to the CPU 17 via an on/off selection switch 23 and an on/off switching detection unit 24.

When the on/off selection switch 23 is switched to "on", an operation to vary a focusing state with the second focus lens unit 15 can be performed with the drive motor 22. When the on/off switching detection unit 24 detects that the on/off selection switch 23 is switched to "on", the CPU 17 stops supplying a driving signal to the focus driver 18 so as to stop driving the first focus lens unit 11 in the optical axis direction, (i.e., stop automatic focus control). On the other hand, when the on/off switching detection unit 24 detects that the second focus lens unit 15 has returned to the initial position and that the on/off selection switch 23 is switched to "off", the CPU 17 supplies a driving signal to the focus driver 18 to resume moving the first focus lens unit 11 in the optical axis direction (i.e., resume automatic focus control).

Figure 2:
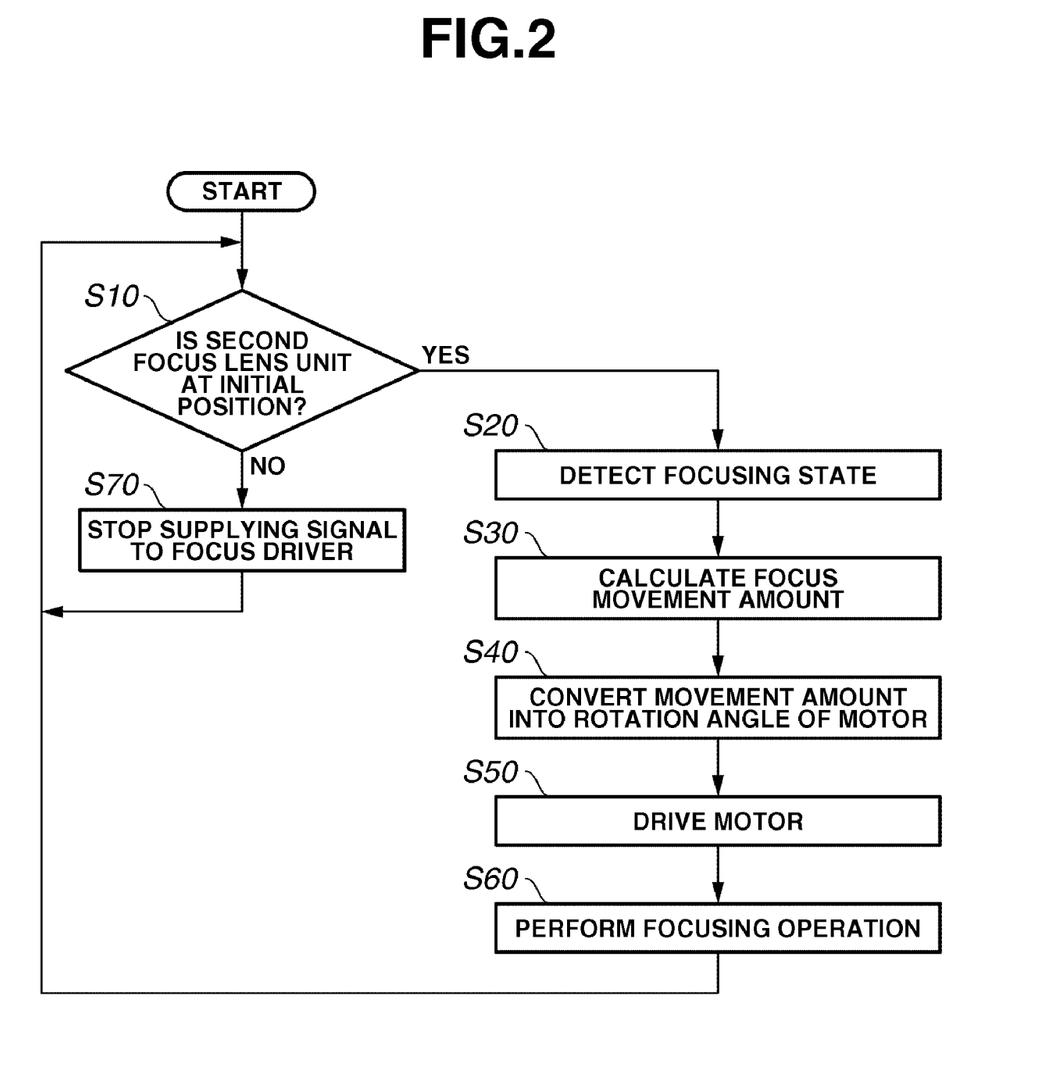
FIG. 2 is a flowchart illustrating a focus control operation according to the first embodiment.

The on/off switching detection unit 24 shown in FIG. 3 can perform the function of the position detection unit 21 for the second focus lens unit 15, which is performed in step S10 of FIG. 2. Accordingly, a control operation similar to that described in the first embodiment can be implemented.

Third Embodiment

Figure 4:
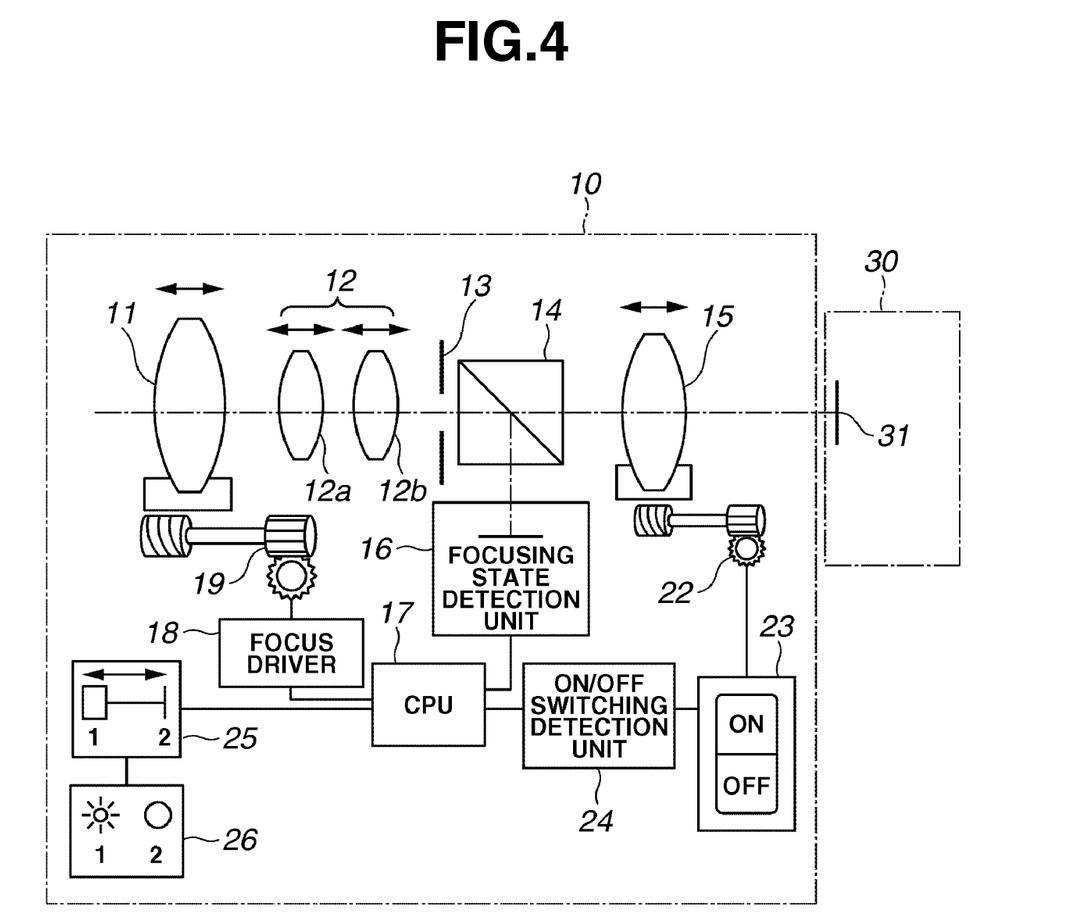
FIG. 4 illustrates a configuration of an imaging apparatus including a lens apparatus according to a third embodiment of the present invention.

FIG. 4 illustrates a configuration of an imaging apparatus including a lens apparatus according to a third embodiment. In FIG. 4, the same reference numerals as in the second embodiment denote similar members. A photographing mode selection switch 25 is connected to the CPU 17. The photographing mode selection switch 25 is operable to switch between first and second photographing modes. A display device 26 is connected to the photographing mode selection switch 25.

In order to switch the control characteristics according to a purpose of photographing, in the first photographing mode, the CPU 17 performs control with the characteristics defined in the above-described first and second embodiments. In the second photographing mode, the CPU 17 continues automatic focus control even when an operation to vary a focusing state with the second focus lens unit 15 is performed.

The display device 26 is configured to display the current photographing mode selected. Accordingly, the user can confirm the current photographing mode so as to reduce or prevent an erroneous operation.

During the first photographing mode, as shown in FIG. 4, numeral "1" lights on the display device 26. During the second photographing mode, numeral "2" lights. In the case of the first photographing mode, in which the mode selection switch 25 is switched to "1", the CPU 17 stops supplying a driving signal to the focus driver 18 so as to stop moving the first focus lens unit 11 in the optical axis direction (i.e., stop automatic focus control). In the case of the second photographing mode, in which the mode selection switch 25 is switched to "2", the CPU 17 supplies a driving signal to the focus driver 18 to continue or resume moving the first focus lens unit 11 in the optical axis direction (i.e., perform automatic focus control). Accordingly, appropriate focus control corresponding to each photographing condition can be performed.

Figure 5:
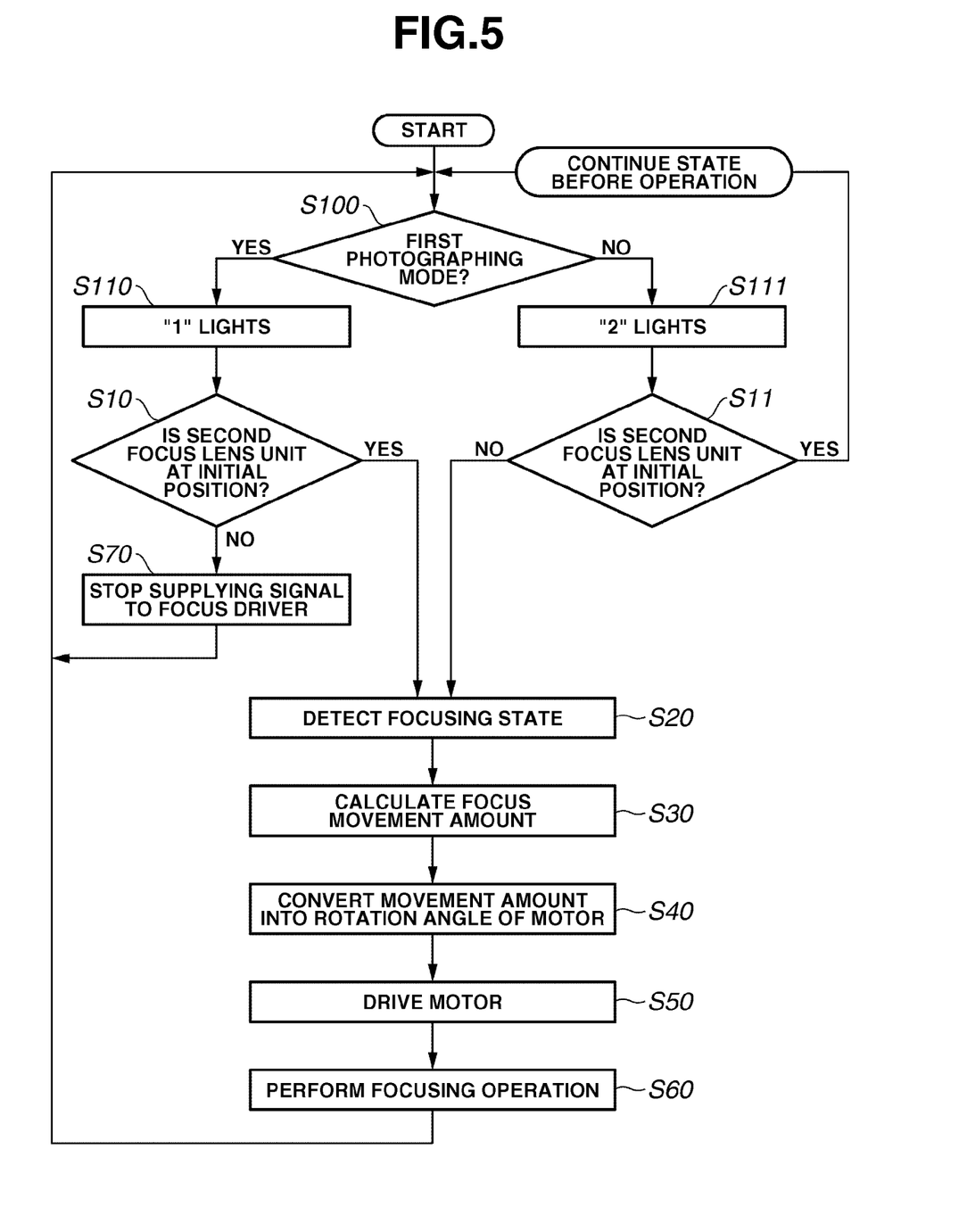
FIG. 5 is a flowchart illustrating a focus control operation according to the third embodiment.

Now, an automatic focus control operation performed when the photographing mode is switched will be described with reference to the flowchart of FIG. 5. In FIG. 5, the same step numbers as in the flowchart of FIG. 2 denote similar operations. First, the CPU 17 determines whether the first or second photographing mode is selected with the photographing mode selection switch 25 (step S100).

When the first photographing mode is selected (YES in step S100), numeral "1", which indicates that the current control is in the first photographing mode, lights on the display device 26 (step S110). Then, the processing proceeds to steps similar to those in the first embodiment shown in FIG. 2. More specifically, in step S10, if it is determined that the focusing state varying operation with the second focus lens unit 15 is being performed (NO in step S10), the CPU 17 stops supplying a driving signal to the focus driver 18 so as to stop automatic focus control (step S70).

On the other hand, in step S10, if it is determined that the focusing state varying operation with the second focus lens unit 15 is not being performed, that is, if it is determined that the second focus lens unit 15 is located at the initial position (YES in step S10), the CPU 17 drives the first focus lens unit 11 based on the value obtained by the focusing state detection unit 16 so as to continue automatic focus control (steps S20 to S60). However, in the third embodiment, an output from the on/off selection switch 24 is used to determine whether an operation to vary a focusing state with the second focus lens unit 15 is being performed (step S10).

In step S100, if it is determined that the second photographing mode is selected, numeral "2", which indicates that the current control is in the second photographing mode, lights on the display device 26 (step S111). In the second photographing mode, similarly to the first photographing mode, the CPU 17 determines whether an operation to vary a focusing state with the second focus lens unit 15 is being performed (step S11). If it is determined that the focusing state varying operation is being performed, that is, when the second focus lens unit 15 is not located at the initial position (NO in step S11), the CPU 17 drives the first focus lens unit 11 based on the value obtained by the focusing state detection unit 16 so as to perform automatic focus control (steps S20 to S60).

Figure 6:
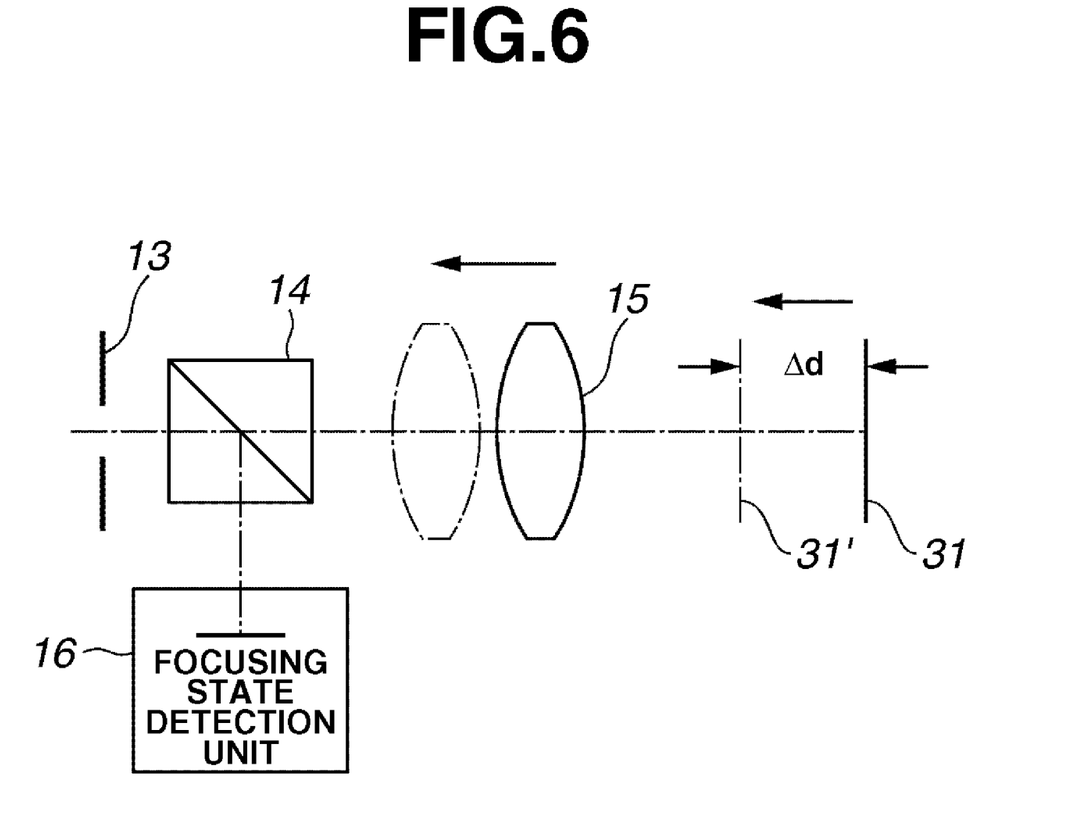
FIG. 6 is a view illustrating blur photography according to the third embodiment.

More specifically, as shown in FIG. 6, in response to the operation of the second focus lens unit 15, the relationship in a focusing state of an image between the image sensor 31 and the focusing state detection unit 16 changes. The in-focus position at the image sensor 31 is displaced by an amount of Δd to become a position 31'. Then, if the CPU 17 continues automatic focus control to drive the first focus lens unit 11 according to an output from the focusing state detection unit 16, the image becomes in focus at the position 31'. As a result, the amount of blurring of an image captured by the image sensor 31 becomes Δd. Letting X be the diameter of the blurred image and Fno. be an f-number, as shown in the following expression, the blurred image diameter X is in proportion to the amount of blurring Δd, and is in inverse proportion to the f-number Fno.

$$x = \Delta d / Fno. \tag{1}$$

Thus, without depending on the movement of an object, the amount of blurring of an image can be set to an amount proportional to the amount of operation of the second focus lens unit 15. Accordingly, blur photography can be performed. Then, when blur photography is completed and the second focus lens unit 15 is returned to the initial position, the image can return to an in-focus state.

On the other hand, in step S11, if it is determined that the focusing state varying operation is not being performed, that is, when the second focus lens unit 15 is located at the initial position (YES in step S11), the CPU 17 continues the state obtained before the focusing state varying operation is started. More specifically, if the focusing state varying operation with the second focus lens unit 15 is started during the automatic focus control, the CPU 17 continues the automatic focus control. If the focusing state varying operation with the second focus lens unit 15 is started when the automatic focus control is stopped, the CPU 17 continues stopping the automatic focus control.

According to the above-described exemplary embodiments, an automatic focus control operation during the focusing state varying operation with the second focus lens unit 15 can be appropriately set. Thus, a user-friendly operation for macro photography or blur photography can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-097363 filed on Mar. 31, 2006, which is hereby incorporated by reference herein in its entirety.

What is claimed is:

1. A lens apparatus configured to be mountable on a camera body including an image sensor, the lens apparatus comprising:
    a first focus lens unit;
    a splitting optical unit disposed between the first focus lens unit and the image sensor;
    a second focus lens unit disposed between the splitting optical unit and the image sensor along the optical axis, the second focus lens unit being movable from an initial position along the optical axis to vary the focusing state;
    a focusing state detection unit configured to detect the focusing state using a light flux from the splitting optical unit;
    an actuator configured to drive the first focus lens unit; and
    a controller configured to control driving of the actuator according to an output from the focusing state detection unit,
    wherein the controller stops driving of the actuator if the second focus lens unit is located at a position different from the initial position.

2. The lens apparatus according to claim 1, wherein the controller resumes driving of the actuator in response to the second focus lens unit having returned from the position different from the initial position to the initial position.

3. The lens apparatus according to claim 1, wherein the controller is settable to one of a first photographing mode and a second photographing mode, wherein the controller, when set to the first photographing mode, stops driving of the actuator if the second focus lens unit is located at the position different from the initial position, and wherein the controller, when set to the second photographing mode, continues driving of the actuator even if the second focus lens unit is located at the position different from the initial position.

4. The lens apparatus according to claim 3, further comprising a display device, the display device being configured to display whether the controller is set to the first photographing mode or the second photographing mode.

5. The lens apparatus according to claim 3, wherein the controller, when power is turned on, maintains a state of the previously selected photographing mode out of the first photographing mode and the second photographing mode.

6. An imaging apparatus comprising:

the lens apparatus according to claim 1; and a camera body configured to mount the lens apparatus thereon, the camera body including an image sensor configured to receive light from the lens apparatus.

* * * * *